United States Patent [19]
Collins et al.

[11] Patent Number: 6,157,989
[45] Date of Patent: Dec. 5, 2000

[54] DYNAMIC BUS ARBITRATION PRIORITY AND TASK SWITCHING BASED ON SHARED MEMORY FULLNESS IN A MULTI-PROCESSOR SYSTEM

[75] Inventors: Eric S. Collins, Barrington; Brett L. Lindsley, Wheaton; Reginald J. Hill, Chicago, all of Ill.

[73] Assignee: Motorola, Inc., Schaumburg, Ill.

[21] Appl. No.: 09/089,721

[22] Filed: Jun. 3, 1998

[51] Int. Cl.[7] ................................................ G06F 12/00
[52] U.S. Cl. .......................... 711/151; 711/158; 710/57; 710/116; 709/107
[58] Field of Search .................................. 711/151, 158; 709/103; 395/673, 287; 710/57, 116

[56] References Cited

U.S. PATENT DOCUMENTS

| | | | |
|---|---|---|---|
| 5,469,558 | 11/1995 | Lieberman et al. | 710/105 |
| 5,524,235 | 6/1996 | Larson et al. | 711/151 |
| 5,983,303 | 11/1999 | Sheafor et al. | 710/126 |

*Primary Examiner*—John W. Cabeca
*Assistant Examiner*—Matthew D. Anderson
*Attorney, Agent, or Firm*—Daniel D. Hill

[57] ABSTRACT

An arbitration and task switching technique in a real-time multiprocessor data processing system (20) having a common bus (32) and a segmented shared memory (30), where fullness of memory segments of the shared memory (30) is used as a measurement for arbitration and task switching priorities. A bus request mechanism in each of the processors dynamically calculates normalized priority values based on relative needs across the system (20). The normalized priority calculation is based on monitoring the fullness of memory segments of the shared memory (30) associated with each processor (24, 26, 28) of the system (20). Using this normalized priority calculation, the bus access order and bus bandwidth are optimally allocated according to tasks executed by the processors (24, 26, 28). Also, the normalized priority calculation and a preprogrammed threshold is used to control task switching in the multi-processor system (20).

33 Claims, 5 Drawing Sheets

DYNAMIC BUS ARBITRATION PRIORITY AND TASK SWITCHING BASED ON SHARED MEMORY FULLNESS IN A MULTI-PROCESSOR SYSTEM

FIELD OF THE INVENTION

The present invention relates generally to bus arbitration and task switching, and more particularly, to bus arbitration and task switching in a multi-processor data processing system.

BACKGROUND OF THE INVENTION

Data processing systems today are becoming more complex and may use distributed or parallel processing with multiple processors to increase processing efficiency and speed. A multiprocessor data processing system may include several bus master devices that share a common resource, such as a bus or a memory. An arbitration system is used to control access to, for example, the bus by the bus master devices to prevent simultaneous access to the bus. A multiprocessor system having a common bus needs a mechanism for prioritizing bus arbitration between the processors. There are several known techniques for prioritizing and arbitrating a shared bus access with several processors.

One known technique for prioritizing and arbitrating a shared bus access is to assign a static set of fixed priority values to each processor based on a relative average through-put that has been computed for each of the processors. This may be based on frequency and/or time periods each of the processors needs access to the bus.

Another known technique for prioritizing and arbitrating a shared bus is to generate processor priority based on a system of timers. Each processor maintains a timer which is an indication of the time since the last time the processor had access to the bus. In the case where two processors make a simultaneous request for the bus, the processor with the largest time since its last access is granted access.

In a real-time processing environment, such as in a multimedia communications system requiring, for example, compression and decompression of data, the above mechanisms for bus arbitration do not result in a system of high enough performance, or possibly even an operable system, because failure to obtain access at a critical time could result in loss of media, e.g., segment of sound. None of the prior art mechanisms can actually track the varying real-time needs of algorithms running on the processors. Therefore, a method is needed for bus arbitration in a real-time processing system that allows for more efficient shared resource usage.

Also, a multi-processor system that processes irregular, real-time tasks can be made to operate more efficiently if the tasks can be switched on each processor.

One known technique to control task switching is to assign a static set of fixed priority values to each task. The fixed priority values are based on relative average through-put requirements, frequency and/or time periods of need. Another known technique for task switching is to assign a running timer to each task. Each timer is reset to zero each time program control switches to its task. When a current task is complete, the task having the highest timer value has priority. Both of these techniques work if the requirements for balancing resource needs between the tasks are relatively relaxed.

In prior art multi-processor systems that have task switching, semaphores are used to pass processing control from one processor to another by writing and reading the semaphores in specific memory locations in a common shared semaphore buffer. To pass processing control in this manner requires repeated accesses to the semaphore buffer by both the upstream and downstream processors each time a data flow decision is needed.

In a real-time processing environment, such as in a multimedia communications system requiring, for example, compression and decompression of data, the above techniques for task switching do not result in a system of high enough performance when a resource, such as a bus or a memory is shared. Also, the frequent accessing of semaphore registers in the shared memory uses excessive bandwidth in communications systems that transmit packets of data in a burst mode. None of the prior art techniques can actually track the varying real-time needs of algorithms running on the processors. Therefore, a method is needed for task switching in a real-time processing system that allows for more efficient shared resource usage.

DESCRIPTION OF A PREFERRED EMBODIMENT

Generally, the present invention provides an arbitration technique in a real-time multiprocessor data processing system having a common bus and a shared memory, where the shared memory is allocated as segments of a memory. The fullness of memory segments of the shared memory is used as a measurement for arbitration priorities. A bus request mechanism in each of the processors dynamically calculates normalized priority values based on relative needs across the system. The normalized priority calculation is based on monitoring the fullness of memory segments of the shared memory associated with each processor of the system. Using this normalized priority calculation, the bus access order and bus bandwidth is optimally allocated according to tasks executed by the processors.

Using this normalized priority calculation, task switching on a processor can also be optimally allocated. A programmable fullness threshold value is used by each processor to generate a ready signal. The ready signal is generated based on a comparison between the programmable fullness threshold value and the shared memory fullness of the memory segments that source and sink data for the task being processed. Using shared memory fullness to control task switching in a multi-processor system allows processing time to be allocated to the task which is the closest to a real-time error situation. Also, tasks that operate with different buffering and throughput characteristics relative to each other can be accommodated. In addition, task switching uses the same hardware as bus arbitration for the shared resource, and operates concurrently with bus arbitration.

The present invention can be more fully described with reference to FIGS. 1–6.

Figure 1:
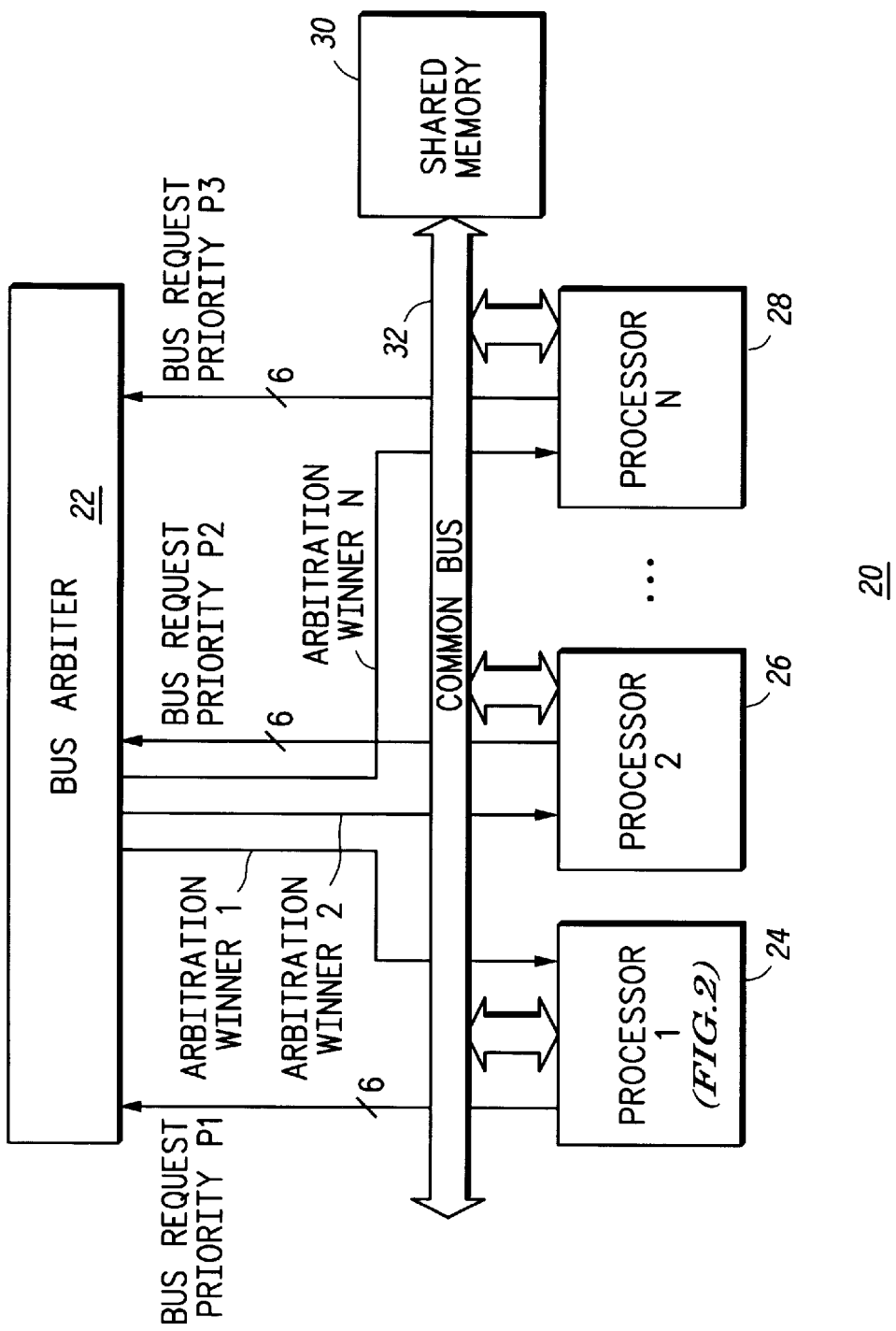
FIG. 1 illustrates, in block diagram form, a multiprocessor data processing system in accordance with the present invention.

FIG. 1 illustrates, in block diagram form, multi-processor data processing system 20 in accordance with the present invention. Data processing system 20 includes bus arbiter 22, a plurality of processors 24, 26, and 28, shared memory 30, and a common bus 32. Each of the processors 24, 26, and 28 can function as bus masters or slaves and can each arbitrate for use of common bus 32. In other embodiments, there may also be modules coupled to common bus 32 that function only as slaves, but still require access to a segment of shared memory 30. Because bus arbitration is based on fullness of the memory segments, a slave device, or module, may also be granted access to the shared memory.

Processor 24 has a bidirectional data terminal coupled to common bus 32, a plurality of output terminals coupled to bus arbiter 22 labeled "BUS REQUEST PRIORITY P1", and an input terminal for receiving a signal labeled "ARBITRATION WINNER 1". BUS REQUEST PRIORITY P1 indicates the fullness of its portion, or segment, of shared memory 30. Likewise, processor 26 is bi-directionally coupled to common bus 32 provides a bus request priority signal labeled "BUS REQUEST PRIORITY P2", and has an input terminal for receiving a signal labeled "ARBITRATION WINNER 2". Processor 28 is also bi-directionally coupled to common bus 32, has an input terminal for receiving a signal labeled "ARBITRATION WINNER N", and provides a bus request priority signal labeled "BUS REQUEST PRIORITY P3". In response to receiving the bus request priority signals from each of the processors, bus arbiter 22 provides a ARBITRATION WINNER signal to each of the processors to indicate which of the processors is to be granted ownership of the bus.

Figure 2:
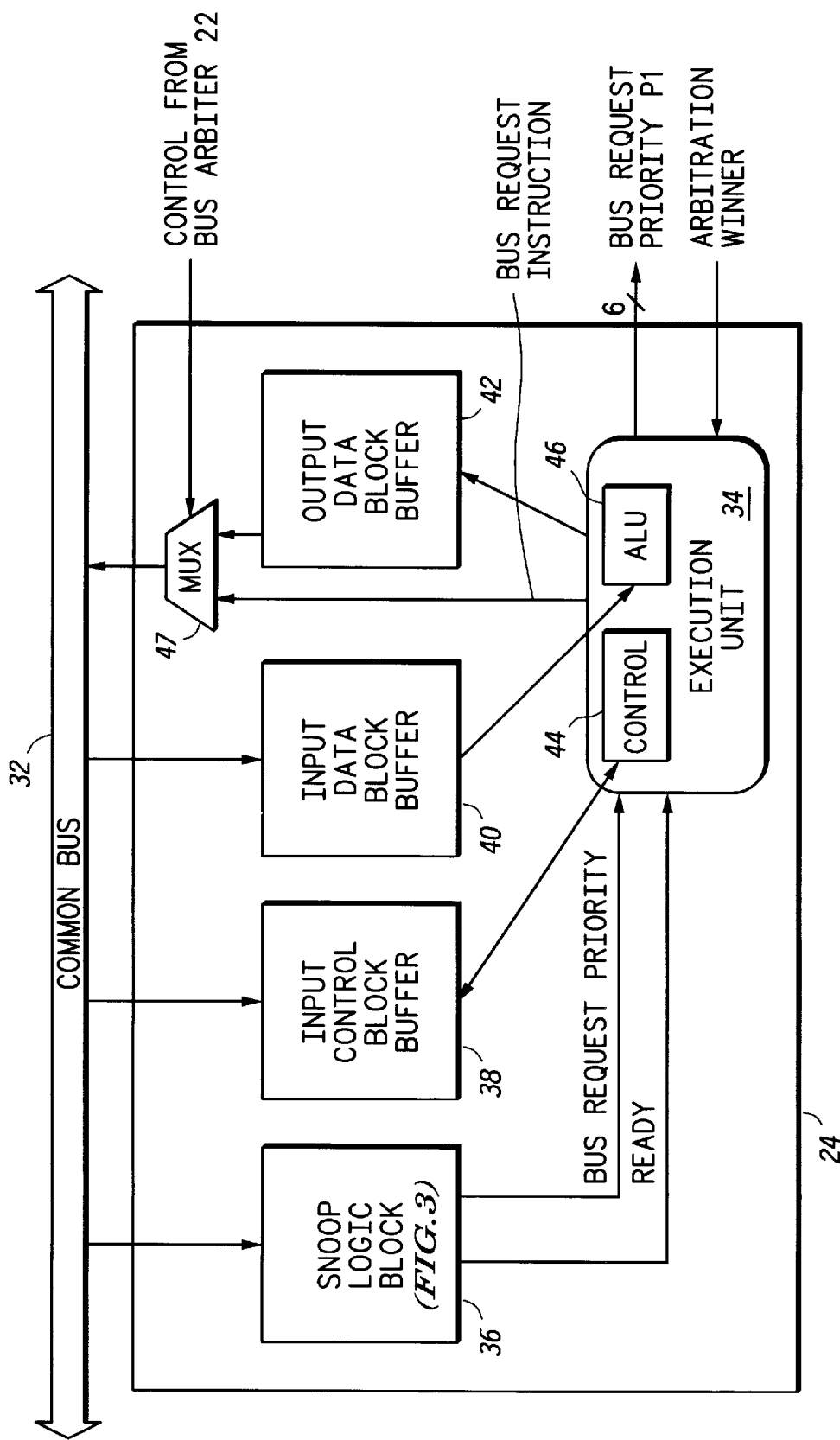
FIG. 2 illustrates, in block diagram form, a processor of FIG. 1 in more detail.

Each of processors 24, 26, and 28 has an arithmetic logic unit on board (see FIG. 2). The arithmetic logic unit includes a bus request generator which is used to track the fullness of a memory segment associated with a real-time task being executed. The system adaptively adjusts for varying processing requirements. Shared memory 30 is divided into multiple memory segments. Each of processors 24, 26, and 28 has access to one or more of the memory segments. In one embodiment, shared memory 30 is a conventional dynamic random access memory (DRAM). In other embodiments, shared memory 30 may be another type of memory such as a static random access memory (SRAM), a flash memory, or any other type of contiguous random access memory. Also, shared memory 30 may comprise several separate memory segments located in different locations, for example shared memory 30 could comprise memory segments physically located on each of processors 24, 26, and 28 which is accessed by each of processors 24, 26, and 28 in a virtual manner.

Common bus 32 is a multiplexed bus for communicating both data and control information. Address information is communicated via a separate bus, which is not shown. A transaction over common bus 32 requires a sequence of operational phases. The operational phases may include arbitration, control, snoop, translation, and data. The control and data phases both share common bus 32. Any number of processors may be coupled to common bus 32. Also, multi-processor system 20 may be implemented on a single integrated circuit or may be implemented as several interconnected monolithic integrated circuits.

To request access to shared memory 30, each of processors 24, 26, and 28 calculates and transmits a bus request priority to bus arbiter 22. Bus arbiter 22 compares each of the bus request priorities and grants access to common bus 32 to the processor having the highest priority. An ARBITRATION WINNER signal is transmitted to each of the processors so that each of the processors "knows" whether or not it has been granted bus priority. The processor which wins bus arbitration transmits a bus request data word on common bus 32, such as the bus request data word 72 illustrated in FIG. 5. Bus request data word 72 is unique for each type of transfer and specifies source, destination, and other information necessary for data transfer. All of the processors in the system receive and monitor the bus request data word. The source and destination can be either shared memory 30 or a processor port. If the source or destination is shared memory 30, an eight bit word called a "handle" is transmitted and if the source or destination is a processor port, an eight bit port address is transmitted. A relative size of the transmitted bus request priorities is used to determine the highest priority.

FIG. 2 illustrates, in block diagram form, processor 24 of FIG. 1 in more detail. Processor 24 is an example of one of the processors which may be coupled to common bus 32. Processor 24 includes execution unit 34, snoop logic block 36, input control block buffer 38, input data block buffer 40, output data block buffer 42, and multiplexer 47. Execution unit 34 includes control unit 44 and arithmetic logic unit (ALU) 46. Execution unit 34 also contains logic for generating BUS REQUEST PRIORITY P1 to be provided to bus arbiter 22 when periodically arbitrating for usage of common bus 32, shared memory 30, or another shared resource.

In one embodiment, input control block buffer 38, input data block buffer 40 and output data block buffer 42 are all conventional first in, first out (FIFO) buffers and are coupled to common bus 32. Also, input control block buffer 38 is bi-directionally coupled to execution unit 34 and input data block buffer 40 and output data block buffer 42 are coupled to execution unit 34. Snoop logic block 36 contains logic for calculating a current priority signal BUS REQUEST PRIORITY which is based on a degree of shared memory fullness. The BUS REQUEST PRIORITY is provided to an input terminal of execution unit 34. Multiplexer 47 has a first input for receiving a bus request instruction from execution unit 34, a second input for receiving output data from output data block buffer 42, a control input for receiving a control signal labeled "CONTROL FROM BUS ARBITER 22", and an output coupled to common bus 32. Note that the signal labeled CONTROL FROM BUS ARBITER 22 is not illustrated in FIG. 1, and that each of processors 24, 26, and 28 will receive a control signal from bus arbiter 22 for controlling multiplexing of output data and the bus request instructions. In response to the control signal, multiplexer either provides the bus request instruction or the output data from output data block buffer 42 to common bus 32. Snoop logic block 36 monitors the bus request instruction words as they are issued on common bus 32 by each arbitration winning processor. When a task is ready to be executed, snoop logic block 36 generates a ready signal labeled "READY", and provides the READY signal to execution unit 34. Execution unit 34 generates the BUS REQUEST INSTRUCTION which is provided to common bus 32. Because task switching priority is derived from transactions on common bus 32, the need for routing additional control lines is eliminated. Note that in FIG. 2, snoop logic block 36 is shown as a separate functional block. However, in other embodiments, the functionality of snoop logic block 36 may be included in one of the other blocks of processor 24, e.g. execution unit 34.

A set of snoop registers are included in snoop logic block 36 for tracking the fullness of shared memory segments of shared memory 30. Each snoop register tracks a single shared memory segment and maintains a current priority value corresponding to the fullness of a corresponding shared memory segment. Snoop logic block 36 changes the current priority value in response to the BUS REQUEST INSTRUCTIONS provided by other processors of data processing system 20. Details of snoop logic block 36 are illustrated in FIG. 3 and will be discussed later.

In the illustrated embodiment, processors 24, 26, and 28 communicate with each other and access shared memory 30 to perform video compression and decompression as well as video pre-processing and post-processing. The other processors coupled to common bus 32 may or may not have the same general features as processors 24, 26, and 28. However, each of the processors must conform to certain bus access protocols depending on the application.

Task switching on one or more of the processors is accomplished by observing the fullness of shared memory segments to determine when to switch tasks. A ready signal is generated when segment fullness indicates that information will begin to be lost if one task is not stopped and another begun. The same hardware used for bus arbitration may also be used for task switching on a processor. By controlling task switching based on memory fullness, real-time needs of data processing algorithms can be met, thus preventing the loss of information.

Figure 3:
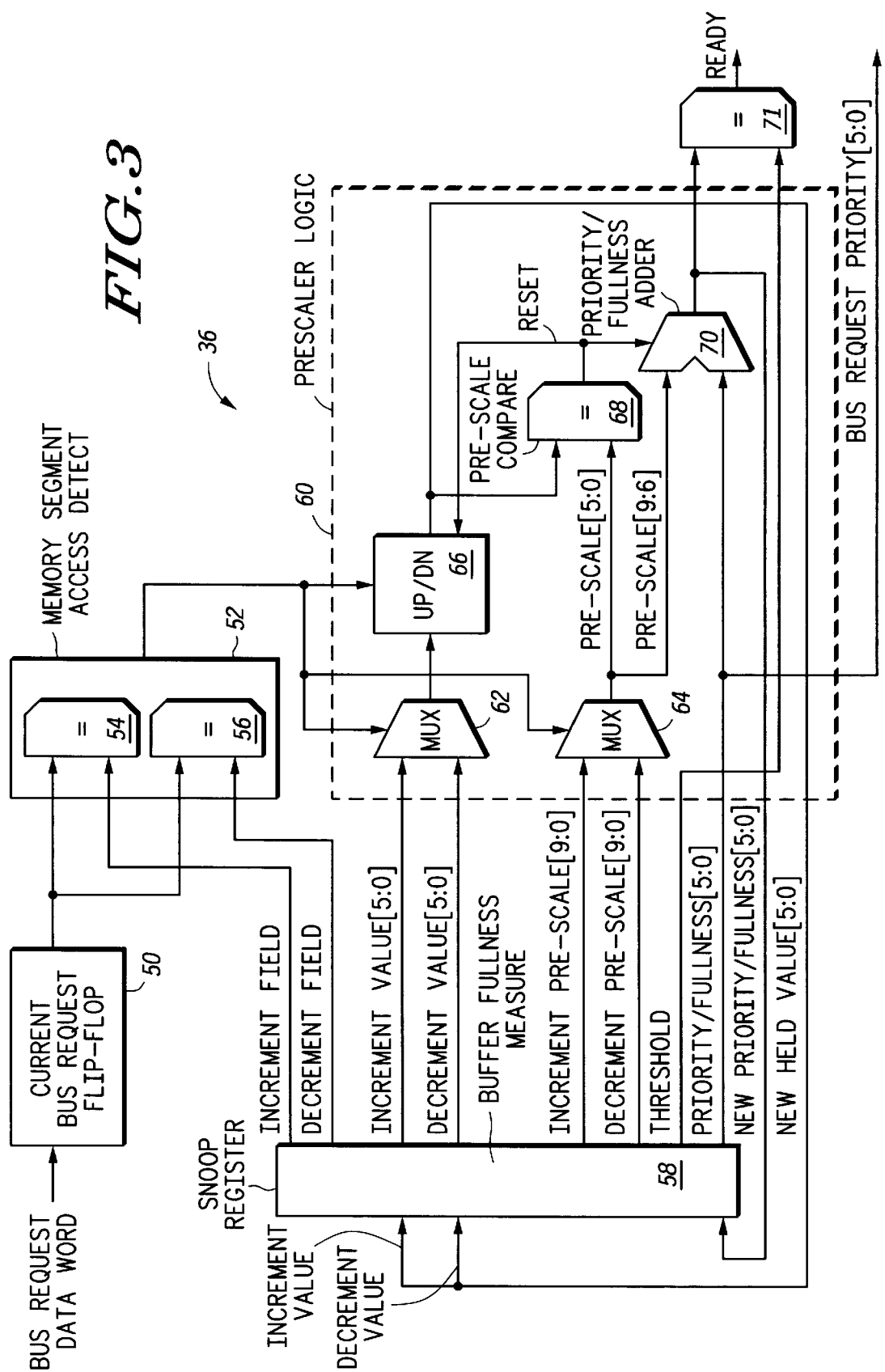
FIG. 3 illustrates, in partial block diagram form and partial logic diagram form, details of the snoop logic block of FIG. 2 for implementing a bus access priority calculation in accordance with the present invention.
Figure 5:
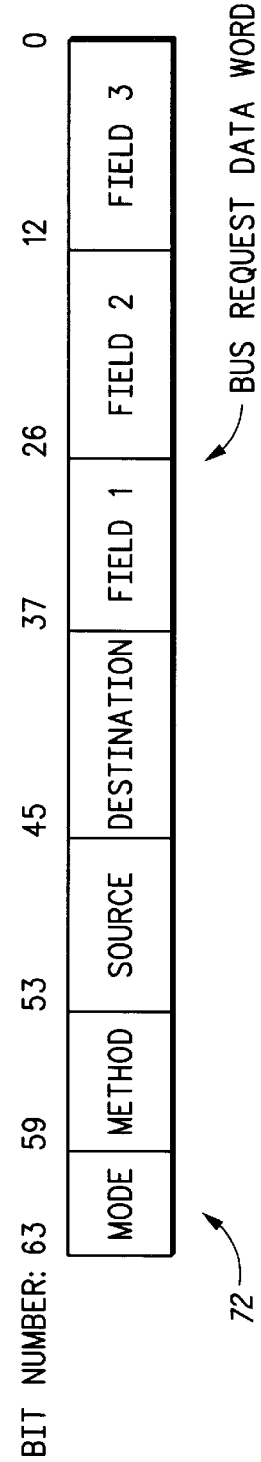
FIG. 5 illustrates, in block diagram form, an example of a bus request data word.

FIG. 3 illustrates, in partial block diagram form and partial logic diagram form, details of snoop logic block 36 which are used for implementing task switching and bus access priority calculations based on memory segment fullness in accordance with the present invention. Snoop logic block 36 includes flip-flop 50, memory segment access detect circuit 52, snoop register 58, pre-scaler logic 60, and comparator 71. Flip-flop 50 has a plurality of input terminals for receiving a bus request data word, and a plurality of output terminals. The specific bit fields of bus request data word are illustrated in FIG. 5 and will be discussed later. Memory segment access detect 52 has a first plurality of input terminals coupled to the plurality of output terminals of flip-flop 50, a second plurality of input terminals, and a plurality of output terminals. Memory segment access detect 52 includes two comparators 54 and 56. Comparator 54 compares a source included in the bus request data word with a source address stored in snoop register 58 labeled "INCREMENT FIELD". In the case of a match between the bus request data word and the INCREMENT FIELD, comparator 54 provides a match signal of a first logic state. Comparator 56 compares a destination in the bus request data word with a destination address stored in a decrement field of snoop register 58 labeled "DECREMENT FIELD". In the case of a match between the bus request data word and the DECREMENT FIELD, comparator 56 provides a match signal of a second logic state. Memory segment access detect 52 has a plurality of output terminals for providing the result of the comparisons to pre-scaler logic 60. When a match is detected in memory segment access detect 52, the memory segment PRIORITY/FULLNESS FIELD is updated.

Snoop register 58 has a plurality of input terminals for receiving a current increment value and a current decrement value, a plurality of output terminals for providing the contents of snoop register 58 to memory access detect 52 and pre-scaler logic 60. For purposes of simplicity and clarity, only one snoop register 58 is illustrated in FIG. 3. However, in the illustrated embodiment, there is a snoop register corresponding to each memory segment of shared memory 30 located in snoop logic block 36.

Pre-scaler logic 60 includes multiplexers 62 and 64, up/down modulo counter 66, pre-scale comparator 68, and adder 70. In pre-scaler logic 60, multiplexer 62 has a plurality of input terminals for receiving an increment value and a decrement value from snoop register 58, a control terminal coupled to memory segment access detect 52, and an output terminal. Multiplexer 64 has a plurality of input terminals for receiving an increment pre-scale value and a decrement pre-scale value from snoop register 58, a control terminal coupled to memory segment access detect 52, and an output terminal. Up/down counter 66 has a first input terminal coupled to the output of multiplexer 62, a second input terminal coupled to an output terminal of pre-scale comparator 68 for receiving a RESET signal, a control terminal coupled to the output terminal of memory segment access detect 52, and an output terminal. Pre-scale comparator 68 has a first plurality of input terminals coupled to the output terminal of up/down counter 66, a second plurality of input terminals for receiving one of increment pre-scale or decrement pre-scale from the output terminal of multiplexer 64, and an output terminal providing the RESET signal for up/down counter 66 and a priority adder 70. Priority adder 70 has first plurality of input terminals coupled to the output of multiplexer 64, a second plurality of input terminals for receiving a priority/fullness value from snoop register 58, and an output terminal for providing a new priority/fullness value to snoop register 58. The priority/fullness value is also provided to execution unit 34 as BUS REQUEST PRIORITY. Comparator 71 has a first input coupled to the output of multiplexer 70 for receiving the NEW PRIORITY, a second input coupled to snoop register 58 for receiving a preprogrammed fullness measure labeled "THRESHOLD", and an output terminal for providing ready signal READY. Generally, pre-scale logic 60 is a priority update circuit that provides normalization of the value held in up/down counter 66 by dividing the accumulated count by an integer number in order.

Shared memory 30 is divided into multiple memory segments, or buffers. A snoop register, such as snoop register 58, is used to keep track of the fullness of each of the memory segments in shared memory 30. As stated above, there is one snoop register per memory segment in shared memory 30. To support memory segments having different depths, programmable normalizing constants are multiplied with fullness measures to attain normalized priority values which are compared across data processing system 20 to determine the winner of the next bus arbitration.

In operation, snoop register 58 keeps track of the fullness of a memory segment of shared memory 30 by storing the occurrence of a predetermined number of events. When a bus request is granted, the bus request data word is written to flip-flop 50. A source field of the bus request data word (see FIG. 5) is compared with the increment value of snoop register 58 using comparator 54. A destination field of the bus request data word is compared with the decrement value using comparator 56. The result of that comparison is a priority change signal that is provided by the output of memory segment access detect 52 to the up/down counter 66.

As an example, when a source in the bus request data word matches a source located in the increment field of snoop register 58, a match signal of a predetermined logic state is provided by memory segment access detect 52 to the up/down counter and for enabling multiplexers 62 and 64. The increment value located in snoop register 58 is then incremented by up/down counter 66. The value in up/down counter 66 labeled "NEW HELD VALUE" is then written back to the increment field in snoop register 58 and is provided to pre-scale comparator 68. Note that, in the case that destinations match in comparator 56, the decrement value of snoop register 58 is decremented by up/down counter 66 and the new destination NEW HELD VALUE is then written back to snoop register 58 and to comparator 68.

Figure 4:
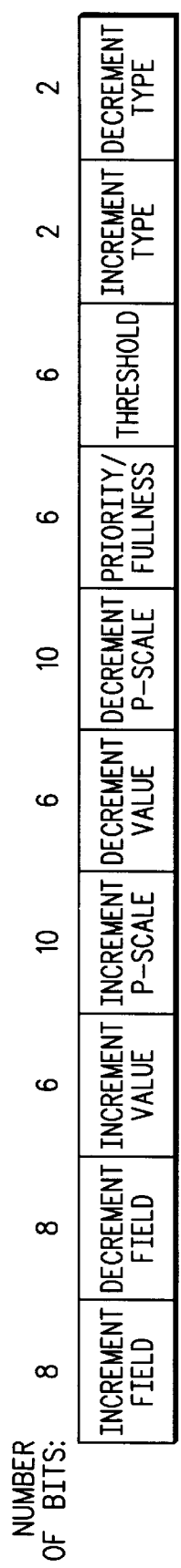
FIG. 4 illustrates, in block diagram form, the snoop register of FIG. 3 in more detail.

The NEW HELD VALUE is compared with the output of multiplexer 64, labeled "PRE-SCALE [5:0]". The output of multiplexer 64 is determined by whether the source or the destination matched in memory segment access detect 52. In the case where sources match in memory segment access detect 52, the lower bits of INCREMENT PRE-SCALE [9:0] from snoop register 58 are provided to the output of multiplexer 64. The upper bits of INCREMENT PRE-SCALE [9:0] are provided to priority adder 70. When comparator 68 detects a match, the value held in the increment and decrement value fields of snoop register 58 are reset to zero and adder 70 determines an updated priority labeled "NEW PRIORITY/FULLNESS". The NEW PRIORITY/FULLNESS is written back to the PRIORITY/FULLNESS field of snoop register 58 (FIG. 4). Also, the NEW PRIORITY/FULLNESS is provided to the first input of comparator 71. Comparator 71 compares the NEW PRIORITY/FULLNESS with the preprogrammed THRESHOLD. If the NEW PRIORITY/FULLNESS compares favorably with the THRESHOLD, then snoop logic block 36 will provide a READY signal to indicate that the processor is ready to execute a task.

By using substantially the same hardware in snoop logic block 36 for both task switching and bus arbitration based on memory fullness, less surface area is used on an integrated circuit. Also, task switching and bus arbitration can operate concurrently for more efficient use of a shared resource and the processors of the multi-processor system.

The INCREMENT PRE-SCALE value and the DECREMENT PRE-SCALE value are preprogrammed, and are used for normalizing the access bus priority calculation to support memory segment fullness measures between memory segments of shared memory 30. The programmable normalizing constants located in the INCREMENT PRE-SCALE and DECREMENT PRE-SCALE fields of snoop register 58 are multiplied with fullness measures and are then compared across data processing system 20 by central bus arbiter 22, illustrated in FIG. 1, to determine the arbitration winner for the next bus arbitration.

Normalizing the access bus priority calculation allows for a balancing of the average access requirements of the system, and allows for a heavily loaded system to function correctly and more efficiently than prior art priority calculation schemes. Moreover, normalization, as used in the present invention, is adaptive based on usage.

FIG. 4 illustrates, in block diagram form, snoop register 58 of FIG. 3 in more detail. Snoop register 58 includes a plurality of bits for storing the increment field, decrement field, increment value, increment pre-scale, decrement value, decrement pre-scale, priority/fullness information, and programmable threshold which are used as described in the discussion of FIG. 3. Also snoop register 58 includes bit fields for storing an increment type and a decrement type. The increment type and decrement type bit fields are used for decoding based on the type of bus request. Note that the number over each bit field indicates the number of bits required for each field in the illustrated embodiment.

FIG. 5 illustrates, in block diagram form, one example of bus request data word 72. Bus request data word 72 includes a plurality of bits for storing transfer mode, method, source, destination, and other additional bit fields which may be necessary for a transfer.

Figure 6:
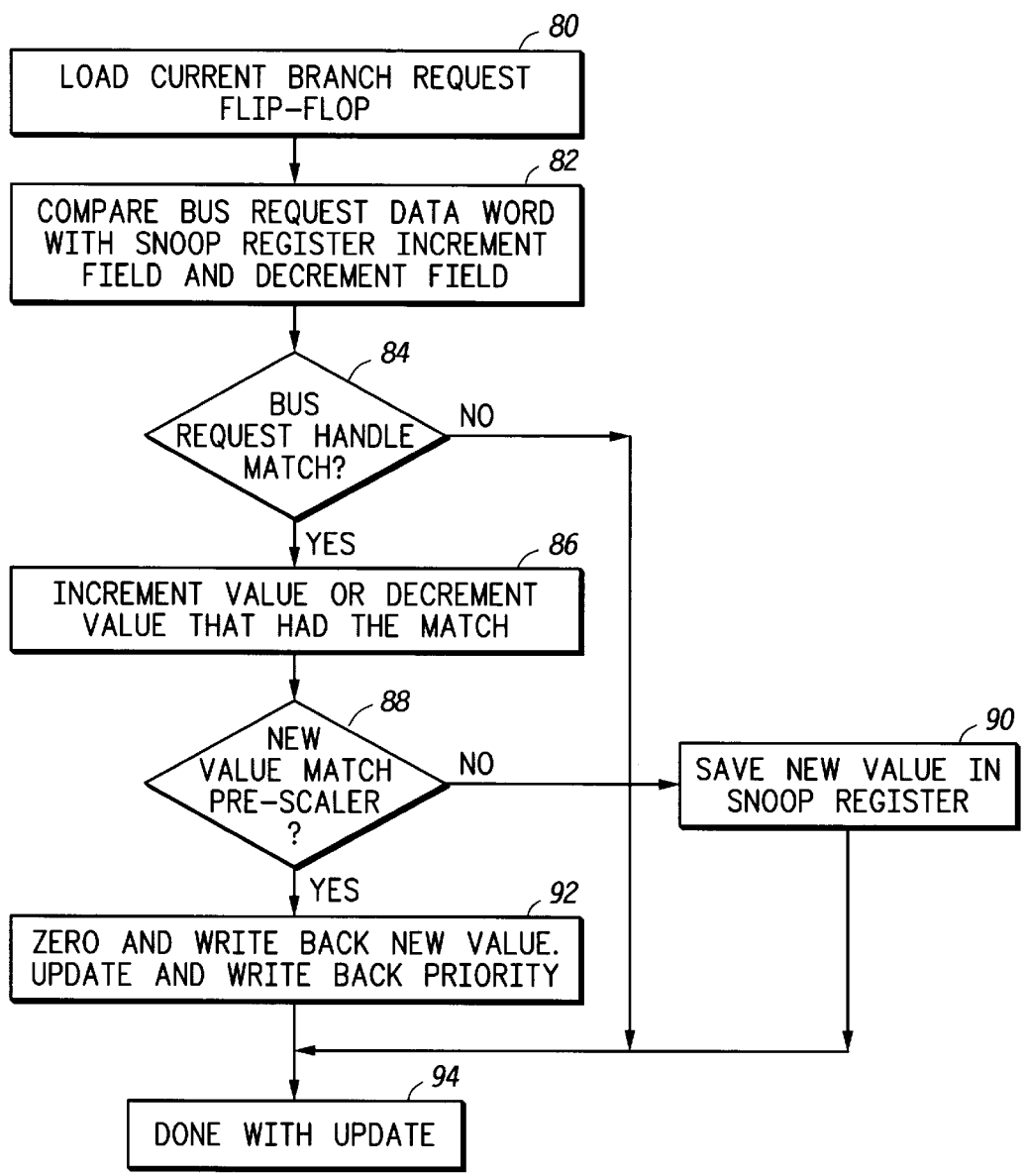
FIG. 6 illustrates a flow diagram for a method for updating the snoop register of FIG. 3 in accordance with the present invention.

FIG. 6 illustrates a flow diagram for updating snoop register 58 of FIG. 3 in accordance with the present invention. At step 80, a current branch request data word is loaded into flip-flop 50. At step 82, the branch request data word source and destination are compared with the increment field and decrement field, respectively, of snoop register 58. At decision step 84, it is determined if the bus request handles match, where the handles correspond to a particular memory segment of shared memory 30. If there is not a match, the NO path is taken from decision step 84 to step 94 and the update is complete. If there is a match, the YES path is taken to step 86, where the corresponding increment value or decrement value is incremented or decremented, as determined by whether the match was for a source or destination at decision step 84.

At decision step 88, it is determined if the NEW HELD VALUE provided by counter 66 matches the PRE-SCALE [5:0] value. If there is not a match, the NO path is taken to step 90 where the NEW HELD VALUE is saved in either the INCREMENT VALUE field or the DECREMENT VALUE field of snoop register 58. If there is a match, the YES path is taken to step 92. At step 92, the increment value or decrement value in up/down counter 66 is zeroed and the NEW HELD VALUE is written back to INCREMENT VALUE field or the DECREMENT VALUE snoop register 58. In addition, the PRIORITY is updated and written back to either the PRIORITY field of snoop register 58. At step 94, the update is complete.

Buffer fullness, as a measure to determine arbitration priority and task switching, is a single value which represents an amount of time in which a calculation is required. Using buffer fullness gives the highest processing priority to the processor which is closest to a failure condition, i.e. memory overflow or underflow. Also, the same hardware is used for the thresholded binary ready condition calculations for task switching. In addition, the hardware can be used for bus access priority during arbitration between processing modules.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true spirit and scope of the invention.

What is claimed is:

1. A bus master device for coupling to a shared memory via a common bus, the common bus adapted to couple to another bus master device, comprising:

an execution unit having an input terminal for receiving a current priority signal which indicates a degree of fullness of a memory segment located in the shared memory, and an output terminal coupled to an output terminal of the bus master device, said execution unit periodically arbitrating for usage of the common bus in response to an internal operation by providing said current priority signal to said output terminal; and a snoop logic block having an input terminal coupled to the common bus, and an output terminal coupled to said input terminal of said execution unit for providing said current priority signal thereto, wherein said snoop logic block monitors a fullness state of said memory segment and changes said current priority signal in response to the another bus master device accessing said memory segment.

2. The bus master device of claim 1 wherein said execution unit further includes a second input terminal for receiving an arbitration winner signal, and wherein the bus master device performs an access to the shared memory via the common bus in response to an activation of the arbitration winner signal.

3. The bus master device of claim 1 wherein the internal operation comprises signal processing of data stored in the memory segment.

4. The bus master device of claim 1 wherein the bus master device is characterized as being a monolithic integrated circuit separate from the another bus master device.

5. The bus master device of claim 1 wherein said snoop logic block comprises:
 a snoop register coupled to the common bus having a priority field which stores said current priority signal, and an increment field which indicates an address of said memory segment;
 a memory segment access detect circuit having a first input terminal coupled to the common bus for receiving a bus request data word, a second input terminal coupled to said increment field of said snoop register, and an output terminal for providing a priority change signal, said memory segment access detect circuit providing said priority change signal in a first logic state in response to a portion of said bus request data word equaling said increment field; and
 a priority update circuit coupled to said snoop register having a first input terminal for receiving said current priority signal, a second input terminal coupled to said memory segment access detect circuit for receiving said priority change signal, and an output terminal coupled to said priority field of said snoop register for providing an updated priority signal equal to said current priority signal plus a predetermined number if said priority change signal is in said first logic state.

6. The bus master device of claim 5, wherein said snoop logic block further comprises a comparator having a first input terminal for receiving the updated priority signal, a second input terminal for receiving a preprogrammed threshold, and an output terminal for providing a ready signal in response to the updated priority signal comparing favorably with the preprogrammed threshold, wherein the ready signal indicates to the bus master device that a task is ready to be executed.

7. The bus master device of claim 6, wherein the preprogrammed threshold is included within a bit field of said snoop register.

8. The bus master device of claim 5 wherein said snoop register further comprises an increment value field for storing an increment value, and wherein said priority update circuit further has a third input terminal for receiving said increment value, and a second output terminal coupled to said increment value field, wherein said priority update circuit adds a held value increment to said increment value and provides a sum thereof to said second output terminal when said priority change signal is in said first logic state.

9. The bus master device of claim 8 wherein said snoop register further includes an increment pre-scale field which stores said predetermined number.

10. The bus master device of claim 9 wherein said increment pre-scale field also stores a pre-scale value and said priority update circuit further includes a modulo counter having an input terminal coupled to said increment pre-scale field, a control terminal for receiving said priority change signal, and an output terminal coupled to said increment value field of said snoop register, wherein said modulo counter increments said increment value using said pre-scale value as a modulus number.

11. The bus master device of claim 8 wherein:
 said snoop register further includes a decrement field which indicates an address of a second memory segment;
 said memory segment access detect circuit further has a third input terminal coupled to said decrement field of said snoop register, said memory segment access detect circuit providing said priority change signal in a second logic state in response to said portion of said bus request data word equaling said decrement field; and
 said priority update circuit further provides said updated priority signal equal to said current priority signal minus a second predetermined number if said priority change signal is in said second logic state.

12. The bus master device of claim 11 wherein said snoop register further comprises an decrement value field for storing an decrement value, and wherein said priority update circuit further has a fourth input terminal for receiving said decrement value, and a third output terminal coupled to said decrement value field, wherein said priority update circuit adds a held value increment to said decrement value and provides a sum thereof to said third output terminal when said priority change signal is in said second logic state.

13. The bus master device of claim 12 wherein said memory segment access detect circuit comprises:
 a first comparator having a first input terminal for receiving said portion of said bus request data word, a second input terminal for receiving said increment value, and an output terminal; and
 a second comparator having a first input terminal for receiving said portion of said bus request data word, a second input terminal for receiving said decrement value, and an output terminal,
 wherein said memory segment access detect circuit provides said priority change signal in said first logic state in response to said portion of said bus request data word equaling said increment value, and providing said priority change signal in said second logic state in response to said portion of said bus request data word equaling said decrement value.

14. A bus master device for coupling to a shared memory via a common bus, the common bus adapted to couple to at least one other bus master device, comprising:
 a snoop register coupled to the common bus having a priority field which stores a current priority signal which indicates a degree of fullness of a memory segment which is located in the shared memory, and an increment field which indicates an address of said memory segment;
 a memory segment access detect circuit having a first input terminal coupled to the common bus for receiving a bus request data word, a second input terminal coupled to said increment field of said snoop register, and an output terminal for providing a priority change signal, said memory segment access detect circuit providing said priority change signal in a first logic state in response to a portion of said bus request data word equaling said increment field;
 a priority update circuit coupled to said snoop register having a first input terminal for receiving said current priority signal, a second input terminal coupled to said memory segment access detect circuit for receiving said priority change signal, and an output terminal coupled to said priority field of said snoop register for providing an updated priority signal equal to said current priority signal plus a predetermined number if said priority change signal is in said first logic state; and an execution unit having an input terminal for receiving said current priority signal, and an output terminal coupled to an output terminal of the bus master device for periodically arbitrating for usage of the common bus in response to an internal operation by providing said current priority signal to said output terminal.

15. The bus master device of claim 14 wherein:

said snoop register further includes a decrement field which indicates an address of a second memory segment;

said memory segment access detect circuit further has a third input terminal coupled to said decrement field of said snoop register, said memory segment access detect circuit providing said priority change signal in a second logic state in response to said portion of said bus request data word equaling said decrement field; and said priority update circuit further provides said updated priority signal equal to said current priority signal minus a second predetermined number if said priority change signal is in said second logic state.

16. The bus master device of claim 15 wherein said snoop register further comprises an increment value field coupled to a fourth input terminal of said priority update circuit which stores an increment value, and a decrement value field coupled to a fifth input terminal of said priority update circuit which stores an decrement value.

17. The bus master device of claim 14 wherein said memory segment access detect circuit comprises:

a first comparator having a first input terminal for receiving said portion of said bus request data word, a second input terminal for receiving said increment field, and an output terminal; and a second comparator having a first input terminal for receiving said portion of said bus request data word, a second input terminal for receiving said decrement field, and an output terminal, wherein said memory segment access detect circuit provides said priority signal in said first logic state in response to said portion of said bus request data word equaling said increment field, and providing said priority signal in said second logic state in response to said portion of said bus request data word equaling said decrement field.

18. The bus master device of claim 14, wherein said priority update circuit further comprises a comparator having a first input terminal for receiving the updated priority signal, a second input terminal for receiving a preprogrammed threshold, and an output terminal for providing a ready signal in response to the updated priority signal comparing favorably with the preprogrammed threshold, wherein the ready signal indicates to the bus master device that a task is ready to be executed.

19. The bus master device of claim 18, wherein the preprogrammed threshold is included within a bit field of said snoop register.

20. A data processing system comprising:

a common bus;

a first bus master device having a data terminal coupled to said common bus, and an output terminal for providing a first priority signal indicative of a fullness state of a first memory segment associated therewith, said first bus master device transferring data over said common bus after receiving a first bus grant signal;

a second bus master device having a data terminal coupled to said common bus, and an output terminal for providing a second priority signal indicative of a fullness state of a second memory segment associated therewith, said second bus master device transferring data over said common bus after receiving a second bus grant signal; and a bus arbiter having a first input terminal for receiving said first priority signal, a second input terminal for receiving said second priority signal, and an output terminal coupled to said common bus for providing a selected one of said first bus grant signal and said second bus grant signal as determined by a relative size of said first priority signal and said second priority signal.

21. The data processing system of claim 20 further comprising a shared memory coupled to said common bus, wherein said first memory segment is stored in a first portion of said shared memory and said second memory segment is stored in a second portion of said shared memory.

22. The data processing system of claim 20 wherein said first memory segment and said second memory segment comprise a common memory segment.

23. The data processing system of claim 22 wherein said first priority signal indicates a number of filled entries of said common memory segment, and wherein said second priority signal indicates a number of empty entries of said common memory segment.

24. The data processing system of claim 20 wherein said first bus master device includes a snoop logic block having an input coupled to said common bus, and an output coupled to said output terminal thereof, said snoop logic block changing a value of said first priority signal in response to said second bus master device accessing said common memory segment.

25. The data processing system of claim 24, wherein said snoop logic block further comprises a comparator having a first input terminal for receiving the changed value of the first priority signal, a second input terminal for receiving a preprogrammed threshold, and an output terminal for providing a ready signal in response to the changed value of the first priority signal comparing favorably with the preprogrammed threshold, wherein the ready signal indicates to the first bus master device that a task is ready to be executed.

26. The data processing system of claim 25, wherein the preprogrammed threshold is included within a bit field of said snoop register.

27. The data processing system of claim 20 wherein said first bus master device and said second bus master device comprise signal processors.

28. The data processing system of claim 20 wherein each of said first bus master device and said second bus master device comprise separate monolithic integrated circuits.

29. A data processing system comprising:

a bus;

a memory unit, coupled to the bus, the memory unit organized as a plurality of memory segments for storing data;

a first execution unit, coupled to the bus, and having an input terminal for receiving a first priority signal which indicates a degree of fullness of a memory segment of the memory unit, said first execution unit for processing a plurality of tasks;

a first logic block having an input terminal coupled to the bus, and an output terminal coupled to said input terminal of said first execution unit for providing said first priority signal thereto, wherein said first logic block monitors a fullness state of said memory segment and changes said first priority signal in response to the fullness state; and a comparator having a first input terminal coupled to the output terminal of the snoop logic block, a second input terminal for receiving a preprogrammed threshold, and an output terminal for providing a ready signal in response to the first priority signal comparing favorably with the preprogrammed threshold, wherein the ready signal indicates that a task of the plurality of tasks is ready to be processed.

30. The data processing system of claim 29, wherein said first logic block comprises:

a register coupled to the bus having a priority field which stores said first priority signal, and an increment field which indicates an address of said memory segment;

a memory segment access detect circuit having a first input terminal coupled to the bus for receiving a bus request data word, a second input terminal coupled to said increment field of said register, and an output terminal for providing a priority change signal, said memory segment access detect circuit providing said priority change signal in a first logic state in response to a portion of said bus request data word equaling said increment field; and a priority update circuit coupled to said register having a first input terminal for receiving said first priority signal, a second input terminal coupled to said memory segment access detect circuit for receiving said priority change signal, and an output terminal coupled to said priority field of said snoop register for providing an updated first priority signal equal to said priority signal plus a predetermined number if said priority change signal is in said first logic state.

31. The data processing system of claim 30, wherein the preprogrammed threshold is included within a bit field of said register.

32. The data processing system of claim 29, further comprising:

a second execution unit coupled to the bus, said second execution unit having an input terminal for receiving a second priority signal which indicates, directly or indirectly, a degree of fullness of a memory segment of the memory unit;

a second logic block having an input terminal coupled to the bus, and an output terminal coupled to said input terminal of said second execution unit for providing said second priority signal thereto, wherein said second logic block monitors a fullness state of said memory segment and changes said second priority signal in response to the fullness state; and a bus arbiter having a first input terminal for receiving said first priority signal, a second input terminal for receiving said second priority signal, and an output terminal coupled to said bus for providing a bus grant signal to either the first execution unit or the second execution unit as determined by a relative size of said first priority signal and said second priority signal.

33. The data processing system of claim 32, wherein said second logic block comprises:

a register coupled to the bus having a priority field which stores said second priority signal, and an increment field which indicates an address of said memory segment;

a memory segment access detect circuit having a first input terminal coupled to the bus for receiving a bus request data word, a second input terminal coupled to said increment field of said register, and an output terminal for providing a priority change signal, said memory segment access detect circuit providing said priority change signal in a first logic state in response to a portion of said bus request data word equaling said increment field; and a priority update circuit coupled to said register having a first input terminal for receiving said second priority signal, a second input terminal coupled to said memory segment access detect circuit for receiving said priority change signal, and an output terminal coupled to said priority field of said register for providing an updated second priority signal equal to said priority signal plus a predetermined number if said priority change signal is in said first logic state.

* * * * *